United States Patent [19]

Puschalovsky et al.

[11] 4,216,886

[45] Aug. 12, 1980

[54] IMMERSIBLE PNEUMATIC WEIGHING DOSER FOR MOLTEN METALS

[76] Inventors: Anton D. Puschalovsky, Brest-Litovsky prospekt, 180a, kv. 7; Leonid I. Prokopenko, ulitsa Deputatskaya, 21, kv. 13; Dmitry L. Strizhevsky, Bolshaya Zhitomirskaya ulitsa, 17, kv. 6, all of Kiev, U.S.S.R.

[21] Appl. No.: 25,604

[22] Filed: Mar. 30, 1979

[51] Int. Cl.$^2$ .............................................. B67D 1/04
[52] U.S. Cl. ................................ 222/595; 164/155; 177/114; 177/207
[58] Field of Search .................. 177/116, 114, 207, 59; 222/56, 52, 61, 595, 591, 603, 77; 164/155, 154, 133

[56] References Cited

U.S. PATENT DOCUMENTS

| | | | |
|---|---|---|---|
| 716,321 | 12/1902 | Webster | 222/595 X |
| 2,287,829 | 6/1942 | Bryan | 222/77 |
| 3,471,057 | 10/1969 | Solheim | 222/595 |

*Primary Examiner*—Joseph W. Hartary
*Attorney, Agent, or Firm*—Holman & Stern

[57] ABSTRACT

The immersible pneumatic weighing doser for molten metals comprises a measuring vessel communicating with a compressed gas source, and a weighing controller. The weighing controller is provided with a lever cantilevering said measuring vessel, and a stress pick-up acted upon by said lever. According to the invention, the measuring vessel is provided with a filling opening closing device comprising a drive disposed on the weighing controller lever.

9 Claims, 11 Drawing Figures

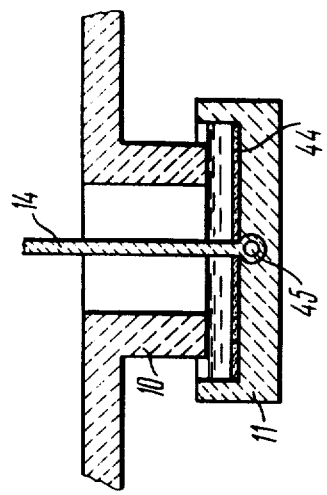
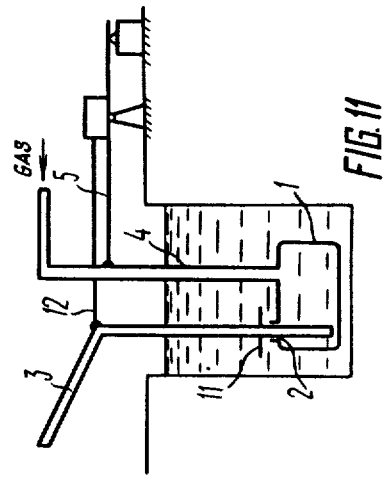
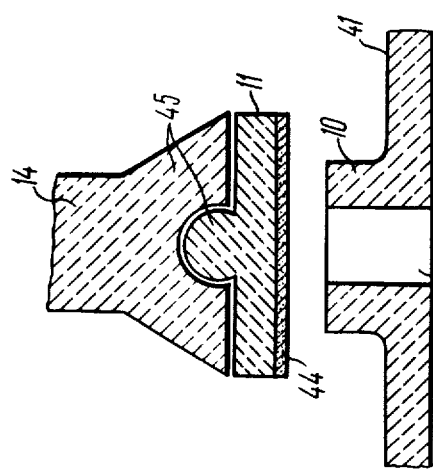
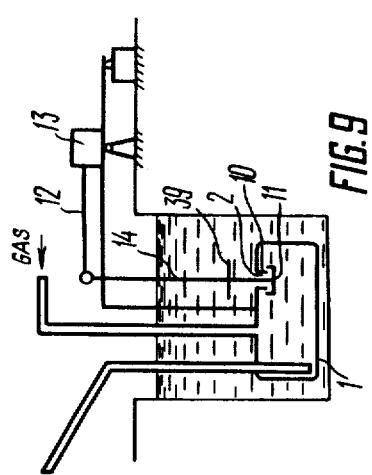

IMMERSIBLE PNEUMATIC WEIGHING DOSER FOR MOLTEN METALS

BACKGROUND OF THE INVENTION

1. Field of the Invention

This invention relates to metal casting, and more particularly to immersible pneumatic weighing dosers for molten metals.

The term "molten metal" will be employed hereinafter to designate both molten pure metals, such as aluminium or magnesium, and alloys, for example, on the base of iron, aluminium or magnesium.

These dosers are adapted for taking molten metal from under the plane of melt in a melting unit and extruding melt doses by a compressed gas into casting molds, for example, of die casting or centrifugal casting machines. It is well known to those skilled in the art that molten metals may be poured into molds not only from the vessels of melting units but also from ladles, mixers and the like.

The term "dose" will be understood hereinafter to mean an amount of molten metal measured in volume or mass units. Thus, the dose measuring in volume units will be understood hereinafter to means "volumetric dosing", and the dose measuring in a mass or weight units will mean "weight dosing". Therefore, immersible pneumatic dosers adapted to accomplish volumetric dosing are called as "volumetric dosers" and immersible pneumatic dosers adapted to provide weight dosing mean "weighing dosers".

2. Brief Description of the Prior Art

Taking of molten metal doses from under the plane of melt in a melting unit and a subsequent extrusion of the doses by compressed gas inert with respect to the melt provide a supply of molten metal practically free of slag and oxides to a casting mold. This is particularly important in manufacturing castings of high quality. Among means for accomplishing this casting method, immersible pneumatic dosers are characterized by low power consumption, small overall dimensions and simple maintanance. However, the problem of dosing by using such dosers has not yet been resolved quite perfectly.

In most cases immersible pneumatic dosers operate on the principle of volumetric dosing. Volumetric dosers are basically similar in construction and comprise a measuring vessel suspended from a bearing element and immersible into a liquid to be dosed and which includes a conduit to let the liquid in, a pipe for discharging a dose, and a pipe for communicating the interior of the vessel with a compressed gas source (see for example, French Pat. Nos. 1204357, 1274944 and Norwegian Pat. No. 130221).

The amount of molten metal contained in immersible pneumatic volumetric dosers is mostly determined either by the capacity of a measuring vessel or by the volume of a compressed gas supplied into the vessel.

Further, the dose size is dependent on some other factors, namely:

the level and respectively the volume of molten metal in the discharge pipe of the measuring vessel at the moment prior to the extrusion of a dose (this volume is a part of the dose);

the partial extrusion of a molten metal through a constantly open opening of the measuring vessel into the melting unit (this effect in the non-valved volumetric dosers invariably takes place at the moment of extrusion of a dose through the discharge pipe);

fluctuations of the melt temperature in a melting unit, in particular a temperature drop as molten metal is taken off;

a change of the inner volume of a measuring vessel as a result of corrosion or of deposit on its walls.

As the molten metal is taken from the melting unit, the melt level lowers therein, and as a result, the molten metal volume in the discharge pipe of the doser decreases and, due to a drop in hydrostatic pressure, the amount of metal extruded through the inlet opening of the measuring vessel back into the melting unit increases. Therefore, each succeeding dose is found to be less than the previous one.

In order to rule out this constantly increasing error in dosing, some attempts have been made for stabilizing the melt level in the melting unit through compensating for the amount of metal taken therefrom either by adding molten metal from an outer source, or (French Pat. No. 1204357) by introducing a compensating body, for example, a compressed gas supplied underneath a bell submerged with its open end into the melt concurrently with the extrusion of doses from the measuring vessel. In any case, the compensation for the melt consumption complicates both the dosing process and the equipment.

The fluctuations of melt temperature affect the pressure of compressed gas used for discharging metal doses and, hence, the accuracy of dosing. The use of an automatic pressure control system (Norwegian Pat. No. 123618) results in complicating the dosing equipment and leads to an increase in its cost.

In general, the problem of improving the dosing accuracy can be more efficiently solved by using the method of weight dosing, wherein the accuracy is not influenced by most of the above factors. The dose size control (within the measuring vessel) presents in this case no special problems.

One weight dosing method is applied in an immersible pneumatic weighing doser (according to USSR Inventor's Certificate No. 431964) comprising, a measuring vessel having a filling opening with a filling pipe passed therethrough into said vessel, the upper end of said pipe being disposed close to the dome of the measuring vessel, and a built-in discharge pipe in the measuring vessel so that its inlet opening is disposed close to the bottom of the vessel. Further, the measuring vessel is provided with a pipe for communicating with a compressed gas source. Said measuring vessel is suspended from a lever secured to a fixed support, said lever being kinematically connected with a weight pick-up. The lever and the pick-up represent the main part of a weighing controller which is to be preliminarily calibrated for the value of buoyancy acting upon the measuring vessel.

The buoyancy value is registered by a measuring device. The term "buoyancy" will be employed hereinafter to designate a resultant value of the buoyancy force acting upon the measuring vessel submerged in the melt and the oppositely directed gravity force of the measuring vessel, which equals to the difference of these forces in absolute values. With a given volume of the measuring vessel, the buoyancy force is a constant, while the gravity force is a variable. When the melt is forced out from the measuring vessel by compressed gas, the gravity force decreases and the buoyancy force increases, respectively. The increment amount of the buoyancy force is equal to the weight of displaced molten metal and does not depend on the molten metal level in the melting unit, fluctuations of molten metal temperature, fluctuations of compressed gas pressure and inner volume changes of the vessel.

However, not the whole amount of molten metal displaced from the measuring vessel gets into the mold. At the starting moment of dosing a part of molten metal passes through the constantly open filling pipe back into the melting unit chamber. It is obvious that a change of hydrostatic pressure in said chamber influences the dosing accuracy.

One of the significant disadvantges of the above-described immersible pneumatic weighing doser is in the depth limits of immersion thereof in the melting unit, since in the lower part of the measuring vessel there is a rather long vertically disposed inlet pipe. Therefore, a considerable portion of molten metal remains in the melting unit. An arbitrary reduction of the filling pipe height is not permissible, as its length is to exceed the height of lift of the molten metal forced out from the measuring vessel through the discharge pipe. Otherwise, the gas may burst through the filling pipe into the chamber resulting in a drop of the working pressure in the measuring vessel and a stoppage of supply of the molten metal into the mold.

Within the limits of the above-described basic diagram of the immersible pneumatic weighing doser for molten metals the displacement of molten metal into the chamber may be prevented and the overall dimensions of the measuring vessel may be reduced only by replacing the filling pipe, which acts as a hydroseal, by a mechanical inlet closing device.

However, as has been practically proved, non-drivable closing devices of a check-valve type are not sufficiently reliable when they are to operate in molten metal, while the closing devices with independent drives do not provide for the required accuracy of dosing. Inadequate accuracy of such devices results from distortions of weighing controller readings caused by the resistance of the closing device elements to the movements of the measuring vessel and the weighing controller lever, when the buoyancy force changes.

Another disadvantage of the described doser is that in the process of discharging the measuring vessel the center of gravity thereof moves in the plane of the lever swing. This movement of the center of gravity changes the arm of the buoyancy force with respect to the rotation axis of the lever. Therefore, the force of the lever action on the stress pick-up also changes, which results in a dosing error.

BRIEF DESCRIPTION OF THE INVENTION

It is a principle object of the present invention to provide an immersible pneumatic weighing doser for molten metals, having a closing device, which is advantageous for raising the accuracy of weight dosing.

It is another object of this invention to provide an immersible pneumatic weighing doser permitting the portion of molten metal taken from the total amount of the melt in a melting unit to be increased.

It is still another object of this invention to improve the operating reliability of the closing device.

The above and other objects of the present invention are attained in that in an immersible pneumatic weighing doser for molten metals, comprising a measuring vessel having a filling opening, a pipe for connecting the vessel interior with a compressed gas source, and a built-in discharge pipe in the measuring vessel so that its inlet opening is disposed close to the bottom thereof, and a weighing controller including a lever connected to a fixed support and to which is cantilevered the measuring vessel, and a stress pick-up kinematically connected with the lever, according to the invention, the measuring vessel is provided with a closing device for the filling opening, having a saddle, a locking element and a locking element drive connected therewith and mounted on the weighing controller lever.

Such arrangement of the immersible pneumatic weighing doser for molten metals improves the dosing accuracy since in the process of dosing the measuring vessel and the closing device drive of the filling opening are moved in synchronism on the weighing controller lever, and therefore the engagement or disengagement of said drive substantially produce no change in weight measuring.

In a simple embodiment of the immersible weighing doser for molten metal, the closing device drive is provided with a driving element linked to the locking element through a rod capable of moving along the axis of symmetry of the filling opening.

In such embodiment of the doser the driving element of the closing device drive is preferably mounted on the weighing controller lever at the point of attachment of the lever to the support.

This arrangement of the closing device drive enables the stress effect upon the dosing accuracy, when the closing device drive comes into action, to be minimized.

It is advantageous to provide an embodiment, wherein the longitudinal axis of the rod of the filling opening closing device and the lever longitudinal axis of the weighing controller are arranged in the same plane.

It is expedient that the plane of the rod longitudinal axis of the filling opening closing device and that of the lever longitudinal axis of the weighing controller be substantially perpendicular to the vertical plane of the discharge pipe of the measuring vessel.

Such arrangement of the discharge pipe eliminates the effect of displacements of the center of gravity of the measuring device on the dosing accuracy in the process of discharging a dose.

It is also necessary that coaxially to the rod of the filling opening closing device above the filling opening of the measuring vessel there be provided a protective screen of a size which is greater than that of the opening to prevent slag and film pieces broken away from the melt surface from getting into the measuring vessel together with the molten metal through the filling opening, when the rod of the closing device is moving.

It is recommended that the saddle of the filling opening closing device be made on the surface of the measuring vessel in the form of a projection corresponding to the perimeter of the filling opening and the locking element be made as a flat cover secured to the rod of the closing device and provided with a washer of fibrous carbonic material.

The so constructed locking element also functions as a protective screen, which enables the fabrication of the doser to be simplified. Further, the washer made of a material resisting to thermochemical attack of the melt provides a more reliable sealing of the closing pair.

In practice, it is of advantage that the above-mentioned flat cover be pivoted to the rod of the closing device to provide a reliable sealing in case of irregularities on the saddle working surface.

It is important that in this embodiment of the invention there be provided a projection on the inner surface of the measuring vessel and a flat cover be placed inside the vessel and provided with a recess corresponding to the projection for housing a fibrous carbonic washer placed on the bottom thereof.

In this case the stress applied for engaging the closing device is reduced due to the effect of an excessive gas pressure in the vessel upon the locking element in the process of dosing. As this takes place, the recess in the cover serves as a protective medium bath for the washer. As a protective medium is used the melt constantly filling the recess. The melt protects the washer from rapid destruction under periodically changing operating conditions, when the locking element is moved from the melt to a gas medium and back when the measuring vessel is discharged or filled. Therefore, this aids in improving the operating reliability of the equipment.

BRIEF DESCRIPTION OF THE DRAWINGS

The invention will become more readily apparent from the following detailed description of embodiments thereof given by way of examples with reference to the accompanying drawings, wherein:

FIG. 8 is a partial vertical longitudinal section of a measuring vessel provided with a closing device, FIG. 9 is a diagrammatic view of an embodiment of the immersible pneumatic weighing doser for molten metals with a closing pair disposed in the vessel, FIG. 10 is a partial vertical longitudinal section of a measuring vessel with an associated closing pair disposed in the vessel, FIG. 11 is diagrammatic view of the most simple embodiment of the immersable pneumatic weighing doser for molten metals, according to the invention.

As shown in FIG. 1, an immersible pneumatic weighing doser for molten metals comprises a measuring vessel 1 having a filling hole opening defined by walls 2. The measuring vessel 1 is provided with a discharge built-in pipe 3. In addition, the measuring vessel 1 is provided with a pipe 4 to be connected with a compressed gas source (not shown in the drawings).

Figure 1:
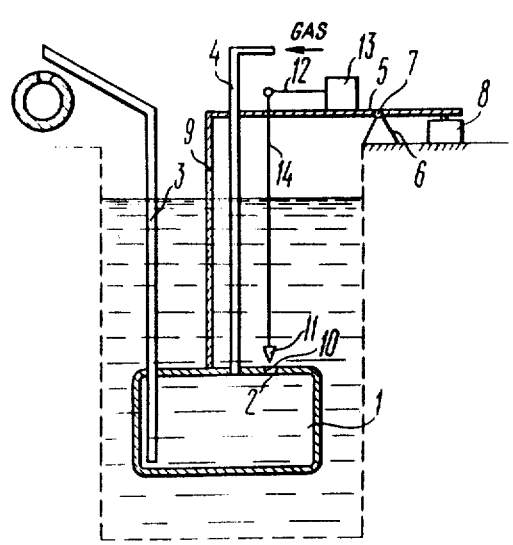
FIG. 1 is a diagrammatic view of an immersible pneumatic weighing doser for molten metals, according to the invention.

The immersible pneumatic weighing doser for molten metals also comprises a weighing controller having a lever 5 fastened to a fixed support 6 by a pivot 7. Further, the weighing controller is provided with a stress pick-up 8 kinematically connected with the lever 5. The measuring vessel 1 is cantilevered to the lever 5 through a bar 9.

According to the invention the measuring vessel 1 is provided with a device for closing the filling opening 2, which device comprises a saddle 10, a locking element 11 and a drive 12 for moving the locking element 11 mounted on the lever 5.

The drive 12 for moving the locking element 11 is provided with a driving element 13, which is connected with the locking element of the closing device through a rod 14 capable to move along the axis of symmetry of the filling opening 2.

Figure 2:
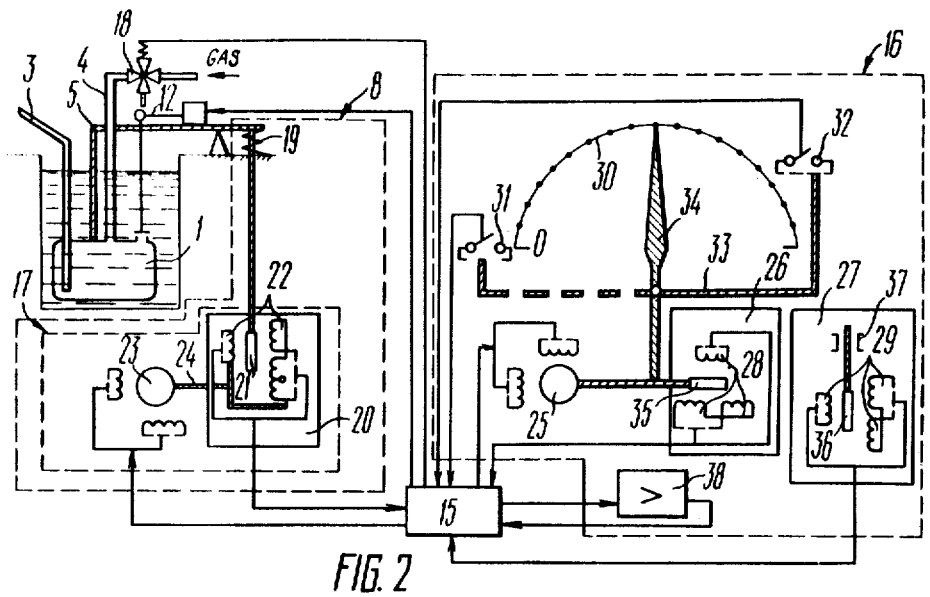
FIG. 2 is a diagrammatic view of an automatic control circuit of the immersible pneumatic weighing doser for molten metals, according to the invention.

As shown in FIG. 2, the immersible pneumatic weighing doser for molten metals is provided with an automatic control circuit. According to the invention, the automatic control circuit includes a commutation unit 15 constructed, for example, from relay-contact elements and a setting device 16. The abovementioned stress pick-up 8 represents a part of the automatic control circuit and is provided with a zero setting device 17. The drive 12 for moving the locking element 11 and a threeway valve 18 with an electromagnetic drive built into the pipe 4 between the measuring vessel 1 and a compressed gas source (not shown in the drawings) are used as actuators.

The stress pick-up 8 includes a resilient element 19 and a differential transducer 20. The transducer 20 includes a core 21 rigidly fixed to the lever 5, and a coil 22 connected to one of the inputs of the commutation unit 15. The coil 22 is made movable and kinematically connected with the zero setting device 17 comprising an electric motor 23 and a driving gear 24 which is made, for example, in the form of a rack-and-gear drive or a screw pair.

The setting device 16 comprises an electric motor 25 similar to the motor 23 and differential transducers 26 and 27 similar to the transducer 20. Coils 28 and 29 of the transducers 26 and 27 respectively are electrically connected to the commutation unit 15. In addition, the setting device includes a weighing scale 30 and a pair of limit switches 31 and 32 actuated by a crank 33 secured to the shaft of the motor 25. The limit switches 31 and 32 are mounted for movement and fixation with respect to the scale 30. To provide a visual reading on the scale 30, there is a pointer 34 fixed to the shaft of the motor 25. The motor 25 is kinematically connected with a movable core 35 of the differential transducer 26. The core of the second differential transducer 27 is also made movable and provided with a fixation mechanism 37. Further, the setting device 16 comprises an amplifier 38 for signals from the differential transducers 20, 26, 27.

Figure 3:
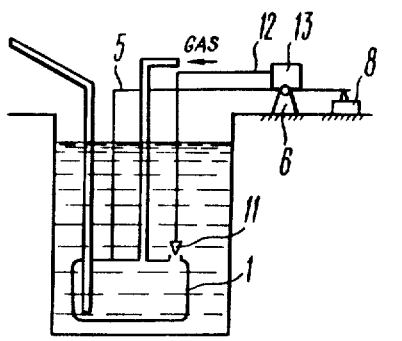
FIG. 3 is a diagrammatic view of an embodiment of the immersible pneumatic doser for molten metals with an optimal arrangement of the driving element of the closing device drive.

Referring now to FIG. 3 of the drawings and an embodiment of the immersible pneumatic weighing doser for molten metals disclosed therein, the driving element 13 of the drive 12 for displacing the locking element 11 is mounted at the point of attachment of the lever 5 of the weighing controller to the fixed support 6, which enables the effect of a stress developed under the action of the drive 12 on the dosing accuracy to be minimized, since the linkage interaction is in this case received by the fixed support 6 rather than by the arm of the lever 5. Therefore, the stress pick-up 8 of the weighing controller is kept free from said stress thereby preventing errors in weighing controller readings.

Figure 4:
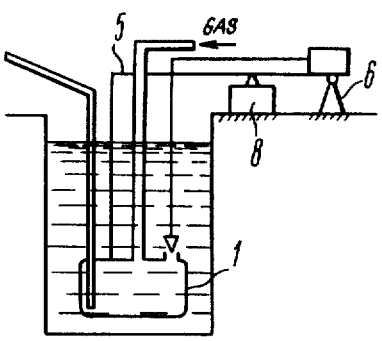
FIG. 4 is a diagrammatic view of an embodiment of the immersible pneumatic weighing doser for molten metals having a weighing controller provided with a lever of the second order.

With reference to FIG. 4 of the drawings, in another embodiment of the immersable weighing doser the lever 5 is a lever of the second order. In this case the stress pick-up 8 is mounted between the fixed support 6 and the fulcrum of the lever 5 (the point of attachment of the measuring vessel to the lever 5). This embodiment provides improved metrological characteristics of the weighing controller as a result of an increased arm of buoyancy. Consequently, when the stress pick-up 8 is actuated, the gain factor produced by the lever 5 increases concurrently with an increase of the weighing controller response.

Figure 5:
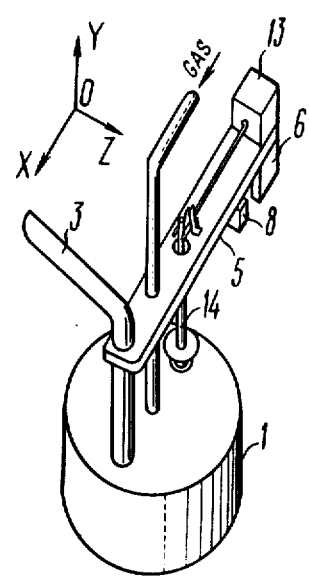
FIG. 5 is an axonometric view of an embodiment of the immersible pneumatic weighing doser for molten metals, in which a preferred arrangement of the discharge pipe is used.

FIG. 5 illustrates an embodiment of the immersible pneumatic weighing doser for molten metals with a preferred arrangement of the discharge pipe 3, according to the invention. In this embodiment the longitudinal axis of the discharge pipe 3 is arranged in substantially vertical plane "ZOY" perpendicular to the plane "XOY," wherein there are arranged the longitudinal axis of the lever 5 and the rod 14. Such arrangement of the discharge pipe 3 eliminates the displacement effect of the center of gravity of the measuring vessel 1 on the dosing accuracy in the process of discharging the melt dose. This is due to the fact that the center of gravity shifts in the plane "ZOY." Therefore, the buoyancy arm with respect to the lever axis is not practically changed and the action of the lever 5 upon the pick-up 8 remains unchanged.

Figure 6:
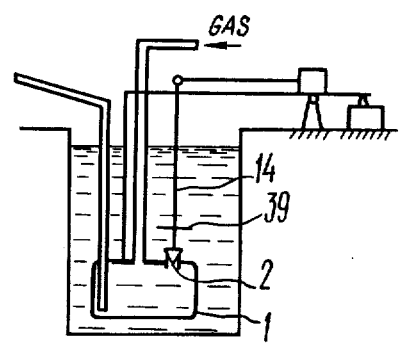
FIG. 6 is a diagrammatic view of an embodiment of the immersible pneumatic weighing doser for molten metals with a filling opening screen.

FIG. 6 shows an embodiment of the immersible pneumatic weighing doser for molten metals, according to the invention, wherein above the filling opening 2 coaxially to the rod 14 there is located a protective screen 39. The size of the protective screen 39 secured to the rod 14 is greater than that of the filling opening 2. The protective screen 39 excludes ingress of slag and film pieces broken away from the melt surface by the rod 14 of the closing device into the measuring vessel 1 through the filling opening 2 of the closing device and drawn towards the opening 2 by the melt flowing into the vessel 1.

Figure 7:
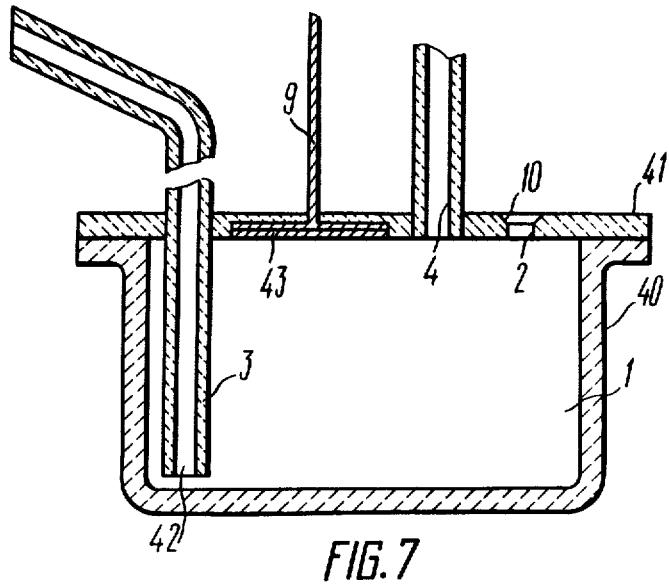
FIG. 7 is a vertical longitudinal section of a measuring vessel and associated pipes.

As shown in FIG. 7, the measuring vessel, according to the invention, is formed as a body 40 closed with a cover 41. The body 40 and the cover 41 are made of a refractory ceramic material. The cover 41 is provided with a filling opening defined by the walls 2 and an opening through which the metal discharge pipe 3 is introduced into the vessel. The pipe 3 is inserted in such a way that its inlet opening 42 is disposed close to the bottom of the body 40. The cover 41 is also provided with an opening through which is tightly inserted the end of the pipe 4. The vessel is secured to the bar 9 by a flange 43.

It is obvious that various modifications of the closing pair (saddle 10 and locking element 11) are possible, and a simple and reliable modification is shown in FIG. 8. In this embodiment, according to the invention, the saddle 10 of the closing device is formed as a projection provided on the cover 41 of the measuring vessel 1 around the periphery of the filling opening 2. The locking element 11 is made in the form of a flat cover bearing on its working surface a washer 44 of fibrous carbonic material. The cover is fastened to the rod 14 by a ball joint 45. The material of the cover possesses good elasticity, heat resistance and chemical stability which provides a reliable sealing of the closing pair. The improved operating reliability of the closing device also results from the hinge joint of the rod 14 and the locking element 11 in the form of a cover providing a tight adjoining of this cover to the saddle 10 in case of irregularities on the working surface of the saddle 10 and when the elements of the closing pair occur to be misaligned in contact. The presence of such irregularities may result from deposit formation or corrosion on the working surface of the saddle 10.

The size of the cover representing the locking element 11 may considerably exceed the size of the filling opening 2. In this case it functions as a screen protecting the opening from entry of slag and film pieces, which enables the fabrication of the immersible pneumatic weighing doser for molten metals to be simplified.

The closing pair may be located within the vessel, as shown in FIGS. 9 and 10. In this case, according to the invention, the projection of the saddle 10 is provided on the inner surface of the measuring vessel 1, and the locking element 11 made in the form of a cover is located in the measuring vessel. Therewith, the rod 14 connecting the locking element 11 to the driving element 13 of the drive 12 is passed through the filling opening 2. The protective screen 39 is fastened to the rod 14.

The cover representing the locking element 11 is provided with a recess corresponding to the projection 10 and housing a washer 44 placed on the bottom thereof.

The described embodiment of the immersable pneumatic weighing doser for molten metals provides an improved operating reliability, since the excessive gas pressure occuring within the measuring vessel 1 in the process of dosing produces an additional stress which acts upon the locking element 11 in the direction of closing. Therefore, the recess in the cover acting as the locking element 11 is intended for containing a protective bath of molten metal with the washer 44 submerged thereinto. The molten metal protects the washer 44 from a rapid distruction which may occur under periodically changing operating conditions. The operating conditions may change when the locking element 11 is displaced from the melt into a gas medium and back in the process of discharging or filling the measuring vessel 1.

FIG. 11 illustrates a simple embodiment of the immersable pneumatic weighing doser for molten metals, according to the invention.

In this embodiment of the immersible pneumatic weighing doser the measuring vessel 1 is secured to the lever 5 through the pipe 4 a portion of which is fixed to the lever 5.

In addition, the discharge pipe 3 is coaxially introduced in spaced relationship into the filling opening 2. The locking element 11 of the closing device is fastened to the vertical part of the pipe 3. The pipe 3 is connected to the drive of the closing device 12 and, therefore, functions as the rod 14 for moving the locking element 11 in the process of opening or closing the opening 2.

The above-described immersible pneumatic weighing doser for molten metals operates as follows.

As shown in FIG. 1, the measuring vessel 1 is completely submerged under the plane of melt in the melting unit. When the drive 12 comes into operation, the closing device opens and the measuring vessel 1 is filled with molten metal through the filling opening 2.

Before discharging the dose it is necessary to correct the zero setting of the cores 35 and 21 of the differential transducers 26 and 20 and set the dose size (FIG. 2). To do this, the coils 28 and 29 of the differential transducers 26 and 27 are connected through the commutation block 15 on command from the operator's panel (not shown in the drawing).

Therewith, the secondary windings of these coils induce voltages whose parameters (magnitude and phase) depend on the position of the cores 35 and 36 in the coils 28 and 29, respectively. With disaligned positions of the cores 35 and 36 there is produced a signal having a voltage equal to the difference of voltages induced in the secondary windings of the coils 28 and 29. This signal is applied through the commutation unit 15 to the input of the amplifier 38 whose output is connected through the commutation block 15 to the electric motor 25, which moves the core 35 untill the difference of voltages induced in the secondary windings of the coils 28 and 29 is equal to zero. As this takes place, the pointer 34 fixed to the shaft of the electric motor 25 is displaced with respect to the scale 30. The setting of the pointer 34 to the zero position of the scale 30 is achieved by varying the position of the core 36 with respect to the coil 29 and then the core 36 is fixed by the fixation mechanism 37. On another operator's command the commutation unit 15 supplies a signal to the drive 12 of the closing device which closes the filling opening 2. At the same time the commutation unit 15 disconnects the coils 28 and 29 and closes the coils 28 and 22. Simultaneously the electric motor 25 is disconnected from the amplifier 38 and the output of the latter is connected to the electric motor 23 of the zero setting mechanism 17.

The setting of the stress pick-up 8 to zero is effected by displacing the coil 22 with respect to the core 21 of the differential transducer 20. The displacement of the coil is effected by the zero setting mechanism 17 coming into action under the influence of an amplified disalignment signal from the differential transducers 20 and 26.

Then the dose size is set by displacing the limit switches 31 and 32. To this end, the limit switch 31 is fixed at the zero position (with respect to the scale 30) and the switch 32 is positioned against the scale division corresponding to the required dose weight.

After all the described preparations have been properly done, the immersible pneumatic weighing doser for molten metals is ready for automatic operation.

The dosing is performed on a signal applied to the commutation block 15 from a pressure die-casting machine or any other similar unit (not shown in the drawing). On this signal amplified by the amplifier 38, the drive of the three-way valve comes into action thereby communicating the interior of the measuring vessel 1 with a compressed gas source (not shown in the drawing). At the same time the electric motor 25 is connected to the output of the amplifier 38. Entering the interior of the measuring vessel 1 the compressed gas forces out the molten metal contained therein through the discharge pipe 3. As the molten metal is discharged, the buoyancy effecting the measuring vessel 1 changes. This change is received by the lever 5 of the weighing controller and transmitted to the stress pick-up 8. The core 21 of this pick-up is displaced with respect to the coil 20 and, as a result, the parameters of the voltage (amplitude and phase) induced in the secondary winding of the coil 20 change. Thus, a disalignment signal of the differential transducers 20 and 26 is produced, which is fed through the amplifier 38 to the motor 25. The motor 25 turns the pointer 34 and the crank 33.

When the crank 33 moves, it acts on the limit switch 32, which closes the circuit of the commutation unit 15 producing a signal for stopping the dosing. On this command, the three-way valve 18 cuts off the communication of the interior of the measuring vessel 1 with the compressed gas source and connects the interior of the measuring vessel 1 with the atmosphere. The process of discharging the molten metal through the discharge pipe 3 is respectively stopped. The weight of the extruded molten metal (dose) is indicated by the pointer 34, whose limit position corresponds to the position of the limit switch 32, i.e. the dose setting. At the same time the drive 12 of the closing device comes into action and the latter opens the filling opening 2 to receive a new molten metal dose into the measuring vessel 1. As the measuring vessel 1 is filled up, the disalignment signal of the differential transducers 20 and 26 changes resulting in a reversing of the motor 25. Being reversed the crank 33 acts on the limit switch 31. As a result of coming into action of said limit switch, the commutation unit 15 breaks the circuit coil 22—the coil 28, and connects the coil 29 of the differential transducer 27 to the coil 28. This enables the core 35 and respectively the pointer 34 to be set to zero. The commutation unit 15 produces a signal, delayed in time, both for closing the closing device and setting the stress pick-up 8 to zero.

The immersible pneumatic weighing doser for molten metals is ready for discharging a new dose.

It is understood that the foregoing detailed description is given merely by way of illustration and that many variations may be made therein without departing from the spirit of the present invention and the scope of the subjoined claims.

What we claim is:

1. An immersible pneumatic weighing doser for molten metals comprising:
    a measuring vessel having a filling opening;
    a pipe for supplying a compressed gas into the interior of said measuring vessel;
    a discharge pipe for discharging molten metal from said measuring vessel, said pipe being disposed within the interior of said measuring vessel with one end thereof close to the bottom of said measuring vessel;
    a weighing controller including:
    a support;
    a lever pivotly mounted on the support, said measuring vessel being secured to one end of said lever;
    a stress pick-up for receiving the stress of said lever;
    a closing device for said filling opening including;
    a saddle comprising a part of said measuring vessel and defining said filling opening;
    a locking element interacting with the saddle;
    a locking element drive mounted on the lever of said weighing controller.

2. An immersible pneumatic weighing doser for molten metals as claimed in claim 1, in which the drive of said closing device comprises a driving element and a rod connecting said driving element with said locking element and capable of moving substantially along the axis of symmetry of filling opening.

3. An immersible pneumatic weighing doser for molten metals as claimed in 2, in which the driving element of said closing device is mounted on the lever of said weighing controller at the point of attachment of said lever to said support.

4. An immersible pneumatic weighing doser for molten metals as claimed in claim 2, in which the longitudinal axis of the rod connecting the driving element and the locking element of said closing device, and the longitudinal axis of the rod of said weighing controller are disposed in the same plane.

5. An immersible pneumatic weighing doser for molten metals as claimed in claim 4, in which the plane of the longitudinal axis of the rod connecting the driving element and the locking element of said closing device, and the longitudinal axis of the lever of said weighing controller is substantially perpendicular to the vertical plane of the axis of symmetry of said discharge pipe.

6. An immersible pneumatic weighing doser for molten metals as claimed in claim 2, comprising a protective screen mounted over the filling hole of said measuring vessel coaxially to the rod connecting the driving element and the locking element of said closing device, the size of said screen being greater than that of the filling opening of said measuring vessel.

7. An immersible pneumatic weighing doser for molten metals as claimed in claim 2, in which the locking element of said closing device comprises a flat cover joined with the rod connecting the latter with the driving element of said closing device, and whose working surface is provided with a washer of fibrous carbonic material, and in which the saddle of said closing device is formed as a projection on the wall of said measuring vessel around the periphery of the filling hole of the vessel.

8. An immersible pneumatic weighing doser for molten metals as claimed in claim 7, in which the flat cover is pivoted to the rod.

9. An immersible pneumatic weighing doser for molten metals as claimed in claim 7, in which the flat cover acting as a locking element of said closing device is disposed whithin said measuring vessel, the upper side of said cover being provided with a recess housing a washer of fibrous carbonic material, and in which the projection providing the saddle of said closing device is formed inside said measuring vessel.

* * * * *